United States Patent [19]

Lützenkirchen

[11] 4,004,291

[45] Jan. 18, 1977

[54] ELECTRIC SIGNAL TRANSMITTER, PREFERABLY FOR ALARM SYSTEM

[75] Inventor: Heinz Dieter Lützenkirchen, Trangsund, Sweden

[73] Assignee: Trapark i Kiruna Aktiebolag, Kiruna, Sweden

[22] Filed: Mar. 28, 1974

[21] Appl. No.: 455,953

[30] Foreign Application Priority Data

Mar. 28, 1973 Sweden .............................. 7304392

[52] U.S. Cl. ......................... 340/310 R; 340/310 A

[51] Int. Cl.² ......................................... H04M 11/04

[58] Field of Search ........... 340/256, 310 R, 310 A, 340/226, 416

[56] References Cited

UNITED STATES PATENTS

| | | | |
|---|---|---|---|
| 2,492,779 | 12/1949 | Anderson | 340/147 MT |
| 3,228,018 | 1/1966 | Benjaminsen | 340/256 |
| 3,234,543 | 2/1966 | Thompson | 340/310 R |
| 3,239,830 | 3/1966 | Schmitt | 340/310 R |
| 3,311,779 | 3/1967 | Hartkorn | 340/256 X |
| 3,312,875 | 4/1967 | Mayier | 340/310 R |

*Primary Examiner*—Harold I. Pitts
*Attorney, Agent, or Firm*—Spencer & Kaye

[57] ABSTRACT

An electric signal transmitter preferably for alarm devices, the transmitter being connected with a manually actuatable switch which is galvanically separated from the signal transmitter and which upon actuation opens or closes respectively the current circuit of a current consuming device connected to the electric mains. The signal transmitter, upon actuation of the switch, generates an output signal, the voltage thereof being less than that of the mains. The transmitter comprises a transformer, the primary winding thereof being connected in series with the switch, the consuming device and the A.C. power source, and the secondary winding thereof being connected to a rectifier which via a semiconductor generates a direct-current voltage signal, with the voltage thereof being less than that of the power source when the circuit, to which the primary winding is connected, is closed.

4 Claims, 4 Drawing Figures

ELECTRIC SIGNAL TRANSMITTER, PREFERABLY FOR ALARM SYSTEM

BACKGROUND OF THE INVENTION

The present invention relates to a signal transmitter.

It is a well-known fact that seriously handicapped people, or indisposed or older persons not being continuously supervised, for whom sudden accidents and illness could be a disaster, are not able, if such an occasion should occur, to call upon the attention of people nearby or inform them about the existing situation by using the telephone, alarm devices or the like and hence, they may lie helpless without receiving appropriate care for a long period of time. This situation can result in the death of such persons.

In order to solve this problem it has among other things been suggested that an additional switch, be provided in connection with e.g. the wall switch for the electric light, whereby upon the manual actuation of such a wall switch the additional switch is also actuated, thereby transmitting a signal to an alarm bell timer or the like, which then is re-set to zero. When such additional switches are provided in connection with all the existing wall switches of a dwelling, a clinic, a home for the aged, or the like and also in connection with the switches for the electrical hearth-plates, television sets etc., actuation of such an additional switch will re-set the alarm bell timer to zero.

In case no such switch is actuated during a predetermined period of time, i.e. if the alarm bell timer is not re-set to zero, the bell, which e.g. can be located at the next-door neighbor, at a porter, or at the outer door of the room of the person in question, alarms indicating that an unanticipated serious accident has occurred.

The use of the system with additional switches in connection with the existing switches has a plurality of drawbacks. The additional switches must be provided in the immediate vicinity of or be connected to the existing switches in order to have the desired effect, which often necessitates an expensive installation and/or redesign. Additionally, in case a low voltage D.C. or A.C. current is supplied to the alarm system, which of course is preferable from the security and cable dimensioning point of view, switches operating with low voltage A.C. or D.C. current are not permitted to be coupled together, according to the Boards for Testing and Approval of Electrical Equipment, with switches connected to the electrical mains, which is a fact preventing such devices from being used.

SUMMARY OF THE INVENTION

The device according to the present invention eliminates the drawbacks with the existing systems and relates in general to a signal transmitter operating completely without moving parts, the signal transmitter being connectable to any cable connected to the mains or to a common power supply installation connected to the mains. The signal transmitter is galvanically separated from the main and transmits a low voltage signal every time a switch connected to the mains is manually actuated, said signal being permitted to re-set to zero an electronic timer or the like connected to an alarm device. Hence, the signal transmitter itself does not deliver any voltage but controls the output side of a transistor being connected to a circuit activated thereby in such a way that an alarm bell timer is re-set to zero.

Other features and advantages of the present invention will be evident from the following detailed description of embodiments of the invention in connection with reference to the attached drawings, where

DETAILED DESCRIPTION OF THE PREFERRED EMBODIMENTS

Figure 1:
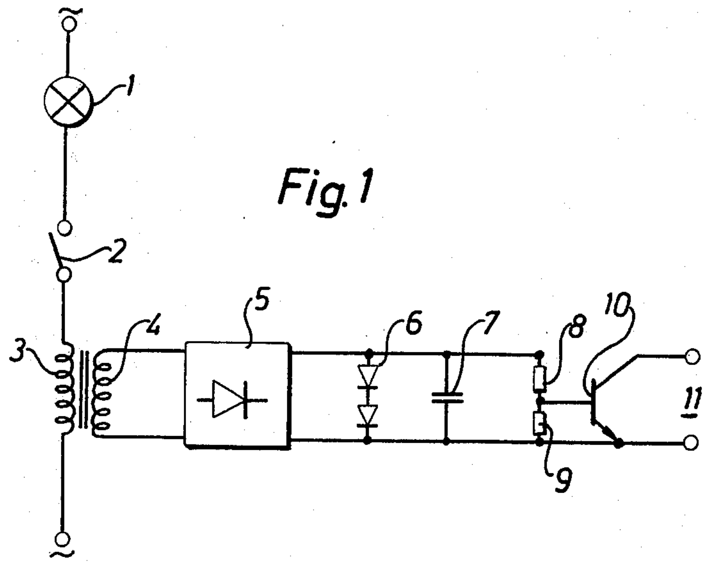
FIG. 1 shows a signal transmitter according to the invention intended for A.C. current.

The embodiment of the signal transmitter according to the invention illustrated in FIG. 1 is intended to indicate that an existing switch of an A.C. current circuit is actuated. Hence, the A.C. mains feed a lamp 1, which can be turned on and turned off by a switch 2. The primary winding 3 of a transformer of the signal transmitter is connected to the supply circuit. The secondary winding 4 of the transformer is connected to an electronic circuit, which in the embodiment illustrated comprises a rectifier 5, the D.C. output terminals thereof being shunted with a number of series connected limiter diodes 6 and with a smoothing condenser 7. The D.C. voltage obtained by the rectifier 5 when the switch 2 is closed is supplied to a voltage-divider comprising a couple of resistors 8 and 9, a transistor 10 being connected by its base to the output side of the voltage divider. An output signal for controlling a not illustrated alarm device is tapped from the collector and emitter of the transistor 10.

When the switch 2 is open and rectifier 5 does not transmit a D.C. signal and of course no output signal is tapped over the output end 11 of the transistor 10. The not illustrated alarm device preferably comprising a timer is then counting on. When the timer reaches a predetermined value, e.g. ten hours, it starts an alarm signal. In case the switch 2 is actuated prior to the expiration of the predetermined time period, i.e. in case the switch 2 is closed, there is current in the A.C. power circuit resulting in a D.C. current from the rectifier 5 resulting in an output signal at the output terminals 11. This output signal will re-set the timer to zero.

By connecting electronic circuitry (not illustrated), which is previously known per se, to the output terminals 11 in series with the timer, the timer can be re-set to zero also when the switch 2 is actuated to break the circuit, this effect is obtained by the fact that the electronic circuitry generates spikes every time the D.C. output signal over the terminal 11 changes value, i.e. every time the switch 2 is actuated to close or open the A.C. supply.

It is of course also possible by minor modifications to the circuit illustrated in FIG. 1 to bring the circuit to only re-set the timer to zero when the switch 2 is actuated to the open position.

Figure 2:
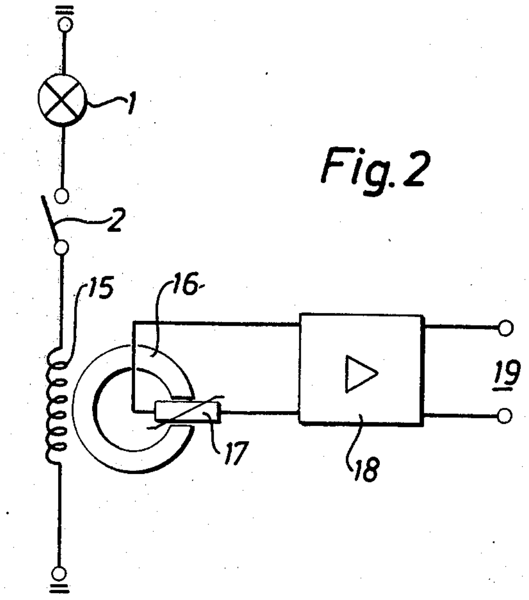
FIG. 2 shows a signal transmitter according to the invention intended for D.C. current

FIG. 2 illustrates a signal transmitter for D.C. current corresponding to the above described signal transmitter for A.C. current systems. In the embodiment the D.C. line is intended to feed the lamp 1 via the switch 2. The coil 15 is connected in series with the switch 2. The coil 15 has a core 16 in the magnetic circuit thereof. The core 16 is provided with a gap wherein a magnetic resistor 17 is provided. The magnetic resistor 17 is connected to an amplifier circuit 18, an output signal is obtained over the terminals 19 thereof for re-setting the not illustrated timer to zero.

The signal transmitter for D.C. current according to FIG. 2 has a corresponding function to that of the signal transmitter for A.C. current according to FIG. 1 and can also be provided with the above mentioned electronic circuitry for re-setting the timer to zero in connection with closing as well as opening the switch 2.

Figure 3:
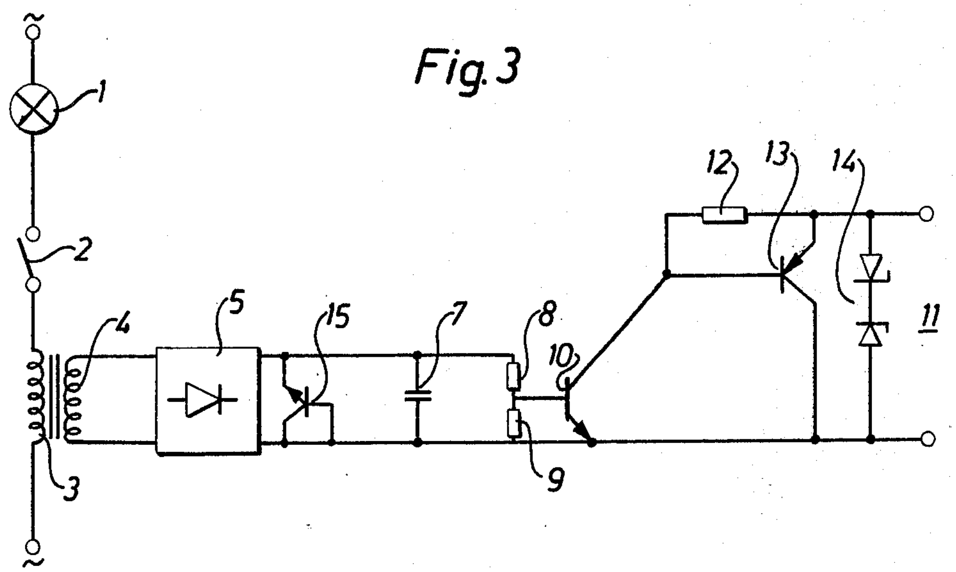
FIG. 3 illustrates a signal transmitter according to a presently preferred embodiment of the invention wherein an amplification circuit is added.

FIG. 3 illustrates a presently preferred embodiment of the invention, wherein an amplification circuit is added. The limiter diodes 6 are replaced by a limiter transistor 15 and the output side of the transistor 10 is connected to an amplification circuit comprising a resistor 12, an amplifying transistor 13 and a limiter chain, a s.c. transient protector device comprising two Zener-diodes 14 coupled in series opposing each other. The output is indicated at 11.

Figure 4:
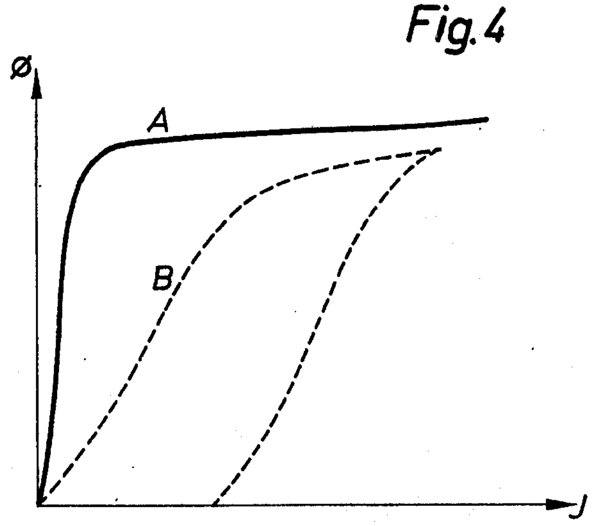
FIG. 4 is a diagram illustrating the saturation curve of the transformer material according to the invention.

FIG. 4 shows the saturation curve A of the specific material preferably used in the transformer 3, 4 according to the invention. The transformer is of EI-type with a common, two-part coil body wth a partition wall, and the primary side thereof comprises two turns of a winding and the secondary side thereof comprises 1200 turns of a winding. As can be seen from the curve the transformer according to the invention reaches saturation considerably earlier than previously known transformers, one example of which being indicated in the figure with broken lines B. Due to this fact the device will react already in connection with extremely small currents on the primary side and already at a value of 40 milliamperes on the primary side the output terminal 11 is actuated. Additionally, extremely small effect losses occur in connection with the present invention under higher load and the primary side has proved to be capable to withstand more than 20 amperes without causing the transformer to burn for that reason.

The specific preferred material of the transformer plate is a ferro-nickel plate — Permalloy C (mymetal) — characterized by high permeability at low induction.

While specific embodiments of the invention above have been described the invention is not restricted to these embodiments since different possibilities exist to redesign the illustrated circuits within the frame of the invention in order to achieve different actuation of the alarm device. Hence, the scope of the invention is only intended to be that as defined in the attached claims.

What I claim is:

1. For use in supervisory alarm system, a signal transmitter means for producing a D.C. output signal whenever a manually actuatable switch, which is connected in series with a current consuming device across an A.C. power source, is closed with the voltage of said D.C. output signal being less than that of said power source, said signal transmitter means comprising: a transformer having its primary winding connected in series with said switch, said current consuming device and said A.C. power source; a rectifier connected to the secondary winding of said transformer; means for limiting the D.C. output voltage from said rectifier connected in shunt across the output of said rectifier; a smoothing condenser connected in parallel with said means for limiting; a voltage divider connected in parallel with said smoothing condenser; a first transistor having its base connected to the output of said voltage divider and whose output voltage, appearing between the emitter and collector thereof, is controlled by the output voltage of said voltage divider; and an amplifier connected to the output of said first transistor, said amplifier including a further transistor having its base connected to the collector of said first transistor and its base collector current path connected in parallel with the emitter collector current path of said first transistor, a resistor connected between the emitter and base of said further transistor, and a limiter chain for providing transient protection, and including a pair of Zener diodes connected in series opposition, connected between the emitter and collector of said further transistor.

2. The signal transmitter according to claim 1, characterized wherein said transformer is of EI-type with a common, two-parted coil body with a partition wall and made of ferro-nickel plate — Permalloy C (mymetal) — having high permeability at low induction and which already at 40 milliamperes at the primary side actuates the output side of said transistor but being capable to withstand more than 20 amperes on the primary side without damaging the transformer.

3. The signal transmitter according to claim 2, wherein said primary side of said transformer comprises two turns of a winding and the secondary side of the transformer comprises 1200 turns of a winding.

4. The signal transmitter as defined in claim 1 wherein said means for limiting comprises a limiter transistor having its emitter collector current path connected in shunt across the output of said rectifier and its base connected to its collector.

* * * * *